Jan. 14, 1941.  E. W. MILLER  2,228,965
GEAR FINISHING TOOL
Filed Nov. 19, 1935  2 Sheets-Sheet 2

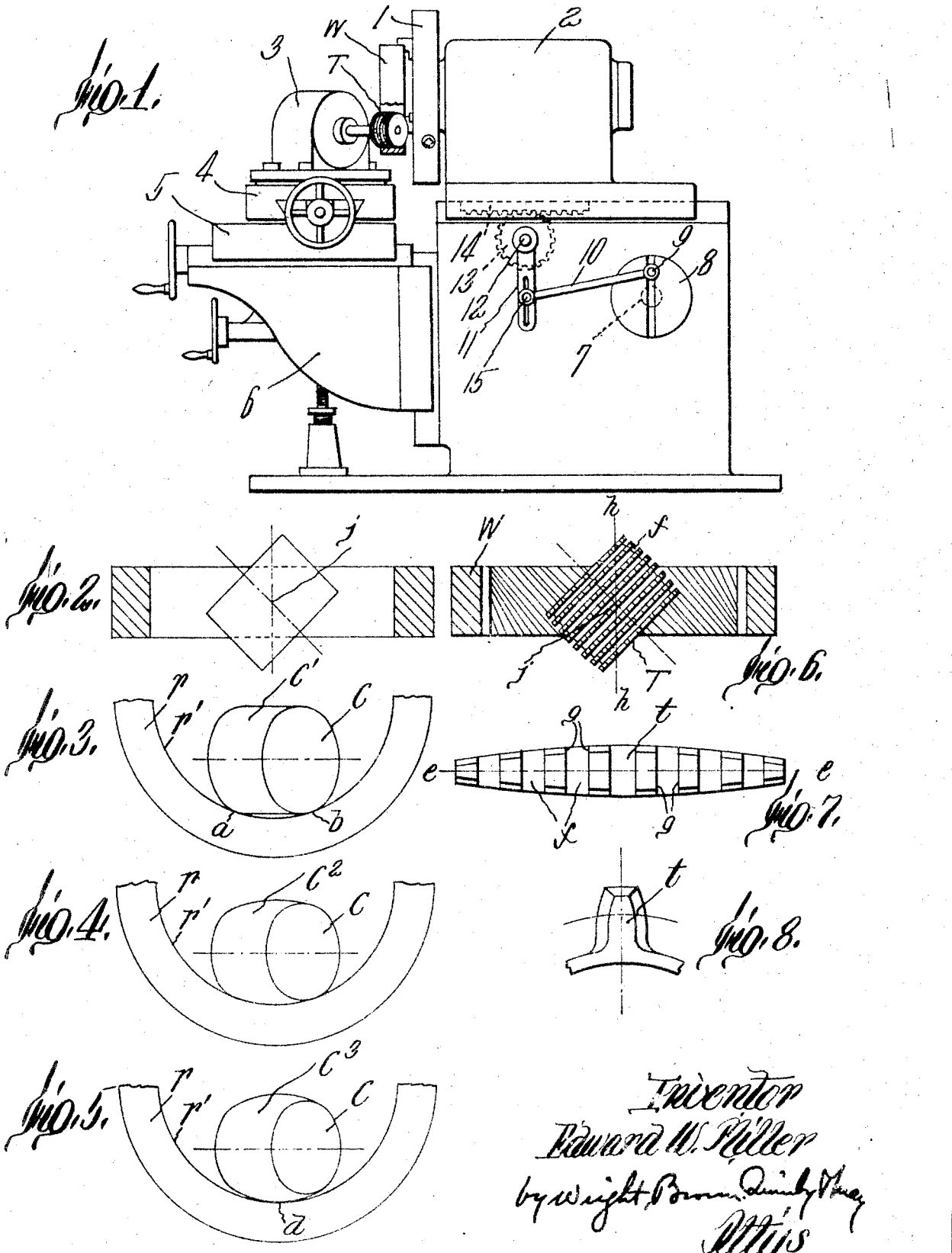

Inventor
Edward W. Miller
by Wright, Brown, Quinby & May
Attys

Patented Jan. 14, 1941

2,228,965

UNITED STATES PATENT OFFICE 2,228,965

GEAR FINISHING TOOL

Edward W. Miller, Springfield, Vt., assignor to The Fellows Gear Shaper Company, Springfield, Vt., a corporation of Vermont Application November 19, 1935, Serial No. 50,573

14 Claims. (Cl. 29—103)

This invention relates to the finishing of gears by, preferably, a combined scraping and burnishing action (but alternatively also by burnishing or lapping alone), effected through the medium of a gear-like tool having teeth conjugate to the gear to be finished so as to run in mesh therewith. An important object of the invention is to finish to extreme accuracy of tooth form, spacing, and concentricity, helical internal gears; but the invention also comprehends the equivalent finishing of internal gears with straight teeth, and of external gears with either helical or straight teeth.

The principle on which the invention operates is that of effecting relative movement between the intermeshing teeth of the tool and work piece along the length of such teeth, by meshing and running them together on axes askew to one another, and of obtaining an extended bearing and surface contact between the meshing teeth by giving to the tool special characteristics of tooth curvature, hereinafter described. Generically this principle is the same as that underlying my copending prior application Serial No. 594,422, filed February 23, 1932, and the present application sets forth further phases of the principle, including the method of finishing gears with the aid of such tool. The principles and characteristics of the invention are explained in the following specification with reference to the drawings, in which Fig. 1 is a diagrammatic elevation of apparatus adapted to perform the herein described method of finishing gears, set up for operation on internal gears;

Figs. 2, 3, 4 and 5 are diagrams illustrating the principles and characteristics of a tool containing the invention applicable for finishing internal gears;

Fig. 6 is an elevation of a tool containing the invention in operative mesh with a helical internal gear;

Figs. 7 and 8 are, respectively, a plan view and an end elevation, on an enlarged scale and with exaggeration of its characteristics, of one of the teeth of the tool shown in Fig. 6;

Figure 12:
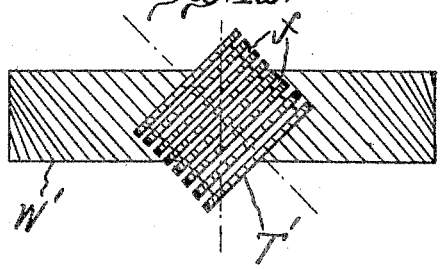
Fig. 12 is a plan view of a tool for finishing external gears in mesh with a gear having helical teeth.
Figure 11:
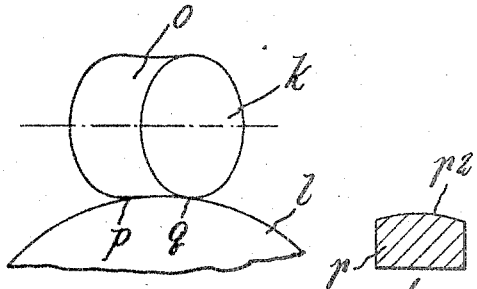
Figure 14:
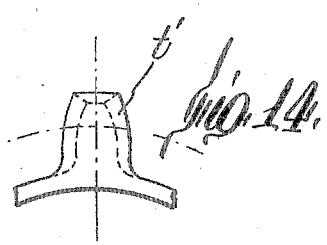
Figures 15, 16:
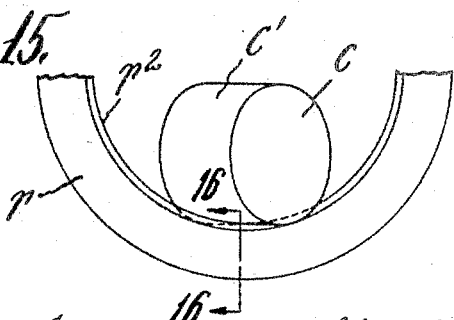
Fig. 15 is a diagram explaining an alternative tool for finishing external gears.
Fig. 16 is a cross section on line 16—16 of the ring shown in Fig. 15.
Figure 17:
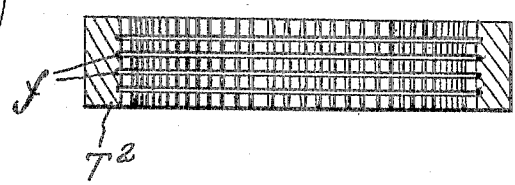
Figure 18:
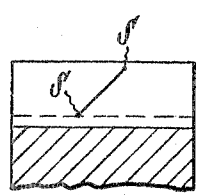
Figure 19:
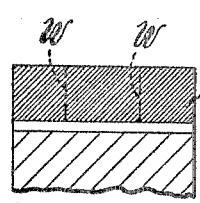

Fig. 17 is a diametral section of an internally toothed finishing tool having a relation to the explanatory Figs. 15 and 16 equivalent to the relation of the tools shown in Figs. 6 and 12 to the diagrams of Figs. 4 and 11, respectively;

Figs. 18 and 19 are side views of a gear tooth illustrating the new character of bearing and finishing effect obtained by the present invention.

Definition: In the following description, the words "length," "longitudinal" and related words, when used with reference to a dimension of a gear tooth (and correspondingly a tooth of a tool), signify the dimension from one end toward the other of the gear (or tool), or of its tooth bearing zone; not the dimension from root to circumferential extremity of a tooth. In the case of a helical tooth, its length is the dimension along the helix.

It is well understood that when gears are arranged to mesh together on non-intersecting and non-parallel axes, their contacting teeth slide or slip lengthwise of one another due to the divergence between their respective paths of revolution. This fact is utilized in the patent of E. R. Fellows, No. 1,960,841, dated May 29, 1934, to burnish or lap gears having either straight or helical teeth, by a conjugate helical or straight-toothed gear, or one having a different helix angle from the work piece, used as a finishing tool. If the tool gear is made of sufficiently hard and tough steel, and its tooth faces are interrupted so as to form scraping edges, a cutting action takes place simultaneously with the burnishing or smoothing effect caused by the segments of the tooth faces between such interruptions. The cutting ability of the tool is a function of the skew angle between the axes of the tool and the work, in the sense that the extent and velocity of the longitudinal slip during the arc of contact, hence the extent of cutting travel, is greater in proportion as the angle between the axes is increased from parallelism, other things being equal. But with very large angles the surface contact between the teeth is too narrow to effect adequate or proper burnishing. And in the case of an externally toothed tool in mesh with an internal gear, or vice versa, neither cutting nor burnishing, except at the extreme ends of the common length of tool and work piece is possible when the angle between the axes is larger than a very few degrees.

The fact last stated is illustrated by Figs. 2 and 3. In these figures, $r$ represents a ring having an internal or concave cylindrical surface $r'$, and $c$ represents a solid body having an external or convex cylindrical surface $c'$. The only condition in which these surfaces can make line contact is when their respective axes are parallel. If one is placed askew to the other, as shown in these figures, contact occurs only at the points $a$ and $b$, where the ends of the cylinder $c$ are tangent to the ring. If the member $c$ were long enough to protrude from the ring, the contact points would be at the ends of the ring. Generically stated, the contact points are at the ends of the common or overlapping length of the two cylinders. A space of progressively increasing and decreasing width exists between the nearest points of the cylindrical surfaces intermediate these contact points. Exactly this kind of limited contact has been proved to exist with external-internal gears when either has helical and the other straight teeth, or both are helical but with respectively different helix angles, and their teeth are correctly conjugate according to the standard principles of gearing.

However, if the member $c$ (which may be called the external member in analogy to an external gear) be developed with a longitudinal convexity of its enveloping surface of revolution equal to the divergence of the internal surface $r'$ from the line $a$—$b$ on the external cylindrical surface, then an even bearing will result. This condition is shown in Fig. 4. The amount and curvature of such longitudinal convexity is dependent on the angle between the axes and the common length of the external and internal members. It will be observed that the radial distance from the axis of the external member to the line of tangency with the internal surface $r'$ is longest at the longitudinal middle of the external member and diminishes progressively to the ends, shortening from point to point along the length of the external member in accordance with the curvature of the line of tangency.

I have discovered that an analogous extended bearing may be effected along the side faces of the intermeshing teeth of internal-external skewed gears by correspondingly varying the width of the teeth of the external gear, i. e., giving their side faces a longitudinally bowed curvature, so that they have maximum width in the middle zone and gradually diminishing width to the ends with a continuous convex curvature lengthwise on both sides. The variation in width is equally distributed on opposite sides of the longitudinal middle line or plane of the tooth. If the teeth are straight (by which I mean that their mid longitudinal planes are straight and coincide with the axis of the gear), then the opposite side faces of the teeth are longitudinally convex equally on opposite sides of the middle plane. But if the teeth are helical, then the convexity is correspondingly related to their median helicoids.

The same gear, if made to mesh with the internal gear without any top or bottom clearances, would also necessarily be longitudinally convex, similar to the curvature $c^2$, on the extremities of its teeth and at the bottoms of its tooth spaces; but ordinarily gears are made with deep top and bottom clearances, wherefore gears having such clearances may be given the lateral bearing described by bowed formation of their sides only or with slight longitudinal convexity of root and outside circumferences.

A bowed gear or tool thus made in exact conformity with the conjugate gear would bear at the sides of its teeth equally and uniformly with mating teeth throughout the common or overlapping length of such teeth. If made of suitable material or composition for burnishing or lapping, or of suitable material for both cutting and burnishing and provided with cutting edges interrupting its tooth faces, it would lap, burnish, or both scrape and burnish throughout such common length when run as the driver of the work gear against sufficient resistance.

By going a step further and making the external member such as that shown in Fig. 5, with a relatively greater longitudinal convexity $c^3$ than the convexity $c^2$ shown in Fig. 4, then the full bearing contact occurs only at the middle of the external member, from which the contact diminishes gradually toward the ends. Correspondingly a toothed gear or tool having teeth with oppositely bowed sides of greater convexity than that which effects uniform bearing from end to end will engage the teeth of the mating internal gear with full bearing in its middle zone and gradual fading away of bearing toward the ends. This characteristic is highly desirable in a finishing tool because it enables a sufficiently intense unit pressure to be applied for effective cutting, without imposing an excessive total pressure between the tool and the work; and at the same time a suitable area of contact to effect a fine burnished finish is obtained when the tooth face curvatures of the tool diverge but slightly from the faces of the work gear.

The new character of bearing obtained by thus bowing the teeth is illustrated comparatively by Figs. 18 and 19. When external gears of the character heretofore known run in mesh with their axes askew to one another, and the teeth of one or both of them are helical correspondingly, the point of contact between their meshing teeth travels in a line of which the character is indicated by the line $s$—$s$ in Fig. 18. That is, the line runs from near the outer extremity to near the root of each tooth face on an inclination, the angle of which depends on the degree of divergence of the two axes and the helix angle or angles of the respective gear teeth. But it is essentially a line only, although actually having some slight width due to the deformation of the tooth substance under pressure.

But if the teeth of one of the gears are bowed so as to bear equally throughout their length in common with the other gear, the contact between their faces in any stationary position is a line; and the progression of such line as the gears run makes an area whereon bearing takes place, which is coextensive with the common length of the gear teeth, and is represented graphically by the shaded area $u$ in Fig. 19 covering the face of the tooth there represented from its outer extremity to the clearance adjacent its root circumference. The difference beween the line $s$—$s$ of Fig. 18 and the area $u$ of Fig. 19 is the measure of the difference between the bearing of unbowed teeth and the bearing of bowed teeth with a companion gear. The character of bearing illustrated by Fig. 19 occurs with intermeshing external-internal gears as well as with two external gears; subject to the modification in the character of bowed curvature later explained.

Finally, if the bowed teeth are made with a curvature which limits their length of contact in the manner described with respect to Fig. 5, the bearing area then resulting may be represented as that between the dotted lines $w$, $w$ in Fig. 19.

where such lines represent the succession of points at which the bowed teeth leave contact with the unbowed teeth, and may be more or less distant from the middle of the teeth and more or less irregular in outline or inclined to the top and bottom bounds of the bearing area.

The tool T illustrated in Figs. 1 and 6, of which one of the teeth is shown in Figs. 7 and 8, is made in accordance with the concept just explained. Its teeth $t$ are convex symmetrically and approximately equally at opposite sides of the longitudinal mid plane $e, e$ with a curvature which effects full bearing on the companion gear at the middle and a gradual fading away of bearing toward both ends, until no contact exists at their end extremities with the teeth of the work piece after the latter has been finished. The drawings show such convexity greatly exaggerated in degree in order to make it readily apparent. Actually the longitudinal face curvature in teeth of the dimensions usually employed in practice is proportionally less than the ratio of curvature to length indicated in the enlarged scale Figures 7 and 8, but is readily measurable.

This tool and its several teeth are shown as interrupted by gashes $f$, the intersections of which with the side faces of the teeth make sharp cutting edges $g$. In defining these edges as sharp I do not mean that the intersecting surfaces which form them must necessarily be at an angle of less than 90 degrees with one another, for as to some of these edges the angles are slightly greater than 90 degrees. But what I mean is that the intersections are brought to a fine enough edge to have a cutting effect on metal.

Fig. 6 shows the tool with the external curvature of revolution similar to the curvature $c^3$ of Fig. 5, which may or may not be found in actual practice, as explained previously. It must be present in greater or less degree, however, in any case where the skew angle or the length of the tool would be great enough to cause interference of the tops of the tool teeth at their ends with the bottoms of the tooth spaces in the work.

With a tool of variable bearing, such as that last described, relative reciprocation between the tool and work piece lengthwise of the axis of the latter is necessary in order to make the teeth of the work piece uniform from end to end. But where the bearing is uniform throughout the length of the workpiece, such reciprocation is not necessary.

The principles of a machine for supporting the tool T and a work piece W and imparting the necessary movements to them, are shown diagrammatically in Fig. 1, for illustration of the principle merely and without intent to limit my claims to any specific machine. Here the work piece W is carried by a chuck 1 having three jaws, which is secured to a work spindle rotatably mounted in a work carriage 2. The tool T is secured to a tool spindle protruding from a head stock 3 and driven by any suitable means (not shown) which may be an electric motor directly connected to the spindle, or a belt drive from any suitable source of power. The head stock is shown as angularly adjustable on a cross slide 4 which is supported by a longitudinally movable slide 5 on a vertically adjustable bracket or knee 6, whereby the tool may be placed in any position to mesh at any desired skew angle with the work. Means for reciprocating the work axially are represented as a shaft 7 having a slotted crank disk 8 and adjustable crank pin 9, coupled by a connecting rod 10 with an arm 11 on a shaft 12, to which is secured a pinion 13 meshing with a rack 14 on the work carriage. By adjusting the wrist pin 15 of the connecting rod along the arm 11, and the crank pin 9 in and out from the axis of shaft 7, any desired length of reciprocative movement of the work carriage may be obtained. It is to be understood that any suitable braking or retarding means may be applied to the work spindle to obtain the requisite pressure between the meshing teeth of the tool and work piece.

In carrying out this method the tool and gear are preferably rotated a great many times for each traverse of the relative reciprocation. For example, a peripheral speed of rotation in the order of 700 feet per minute is suitable and practicable, while the work may be reciprocated in the order of three complete back and forth movements per minute; or at a slower or faster rate if desired. These reciprocating movements are preferably carried out to the extent that each end alternately of the work is brought to the middle of the tool, that is, as far as the point $j$ in Fig. 6.

By providing the tool with a hunting tooth, and effecting rotation and reciprocation substantially as described, all teeth of the work piece are acted on repeatedly by all the teeth of the tool, and are skived and burnished throughout their length, with obliteration of surface excrescences, defects, and tool marks, and reduction of all aberrations of dimensions, form and eccentricity to substantially exact uniformity.

Internal gears with helical teeth of any helix angle may be thus finished by the operation of a tool having straight teeth (that is, straight in the sense that their longitudinal middle lines are parallel with the axis of the tool, and disregarding the bowed or convex characteristics described). However, in case the helix angle is too small to give sufficient divergence of orbit between the cutter and tool, the tool may be provided with helical teeth of large enough helix angle to obtain the desired divergence. And, equally, internal gears with straight teeth may be finished in the same way with a helically toothed tool. The practical limitation to the divergence of the axes is that which would cause interference of the work piece with the tool spindle at the nearer limit of its reciprocation.

Figure 9:
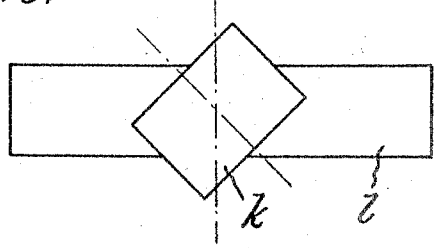
Figs. 9, 10 and 11 are views similar to Figs. 2, 3 and 4, respectively, illustrating the principles of the invention as embodied in a tool for finishing external gears.
Figure 10:
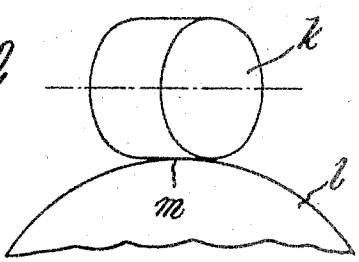
Figure 13:
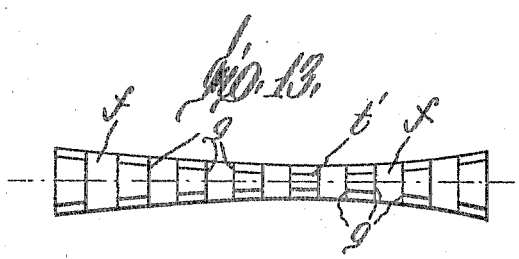
Figs. 13 and 14 are views of the same character as Figs. 7 and 8, respectively, of one of the teeth of the tool shown in Fig. 12.

The invention includes also the converse of the proposition thus demonstrated; embodied in first, the process and means for finishing external gears with an externally toothed tool of longitudinally concave curvature, and second, effecting the same result with an internally toothed tool of convex tooth curvature longitudinally. The first such alternative phase of the invention is shown in Figs. 9–14. With reference to Figs. 9 and 10, it is seen that two external cylinders, as $k$ and $l$, when placed in contact with their axes askew to one another, make contact only at a single tangent point $m$. But if one of the cylinders, as $k$, is changed to a concave body with a longitudinal curvature in its enveloping surface $o$ conforming to the divergence of member $l$ from the original surface of $k$, it will contact continuously with the surface of member $l$ throughout the arc from $p$ to $q$. And if the member $k$, or a corresponding body, is made with a less concavity than that needed for full length bearing, it will bear at its middle on the member $l$ and pass gradually out of contact toward its ends, substantially as described with respect to the convex member in Fig. 5. Such less concave curvature is essentially equivalent to the more convex curvature explained with respect to Fig. 5.

When externally toothed members are related to one another angularly, as the cylinders $k$ and $l$, and either has helical teeth conjugate to the other, or the teeth of both are helical complementally to the divergence between their axes, but with no concavity, then the bearing between meshing teeth is limited to point contact or to such small areas as result from flattening of the metal under pressure. But if the teeth of either such gear are made longitudinally concave or bowed in their opposite side faces, symmetrically with respect to the median planes or helicoids (as the case may be) of the teeth, and to the extent which permits full penetration with the teeth of the other gear throughout their common length, then equal bearing will result throughout such common length. Or if the symmetrical longitudinal concavity is made less (negatively more convex) than that, then the bearing will gradually fade away from full bearing at the middle zone toward the ends, while being far greater than with non-bowed teeth.

Thus the tool T', shown in Fig. 12, corresponding to the concave gear last described, and having teeth $t'$, with longitudinally concave sides and being interrupted or gashed at $f, f$ to provide scraping edges $g, g$ will mesh with an external gear W' and have a cutting and burnishing action essentially like that of the tool T with reference to the internally toothed work piece W. By making the tool with sufficient concavity, bearing areas between the cutting edges are obtained adequate to give sufficient burnishing effect however great the angularity between the axes may be. The circumferential ends of the teeth and bottoms of the tooth spaces may also be concave longitudinally as shown, or straight, depending on whether or not the bottom clearance in the tooth spaces of the work gear is sufficient to avoid interference with the points of the tool teeth in their mid length, and vice versa. Here also either a straight toothed tool may be provided to finish a helical gear, or a helically toothed tool to finish either a straight toothed gear or a helical gear of different helix angle from that of the tool. The point desired to be emphasized here is that the teeth of the tool may be made helical with any angularity needed to permit meshing with a work piece at any degree of axial angularity needed to effect a desired quality of cutting action, whatever the helix angle of the work piece teeth may be between the maximum and zero.

The process may be carried out on an external work piece with the aid of a machine such as that shown in Fig. 1, by removing the chuck and mounting the work piece directly on the work spindle, and adjusting the tool in the proper position.

Comparing Figs. 15 and 16 with Figs. 2, 3 and 4, it will be seen that extended lengthwise contact between internal and external members may be obtained by making the surface $r^2$ of the internal member of longitudinally bowed formation with convexity toward the axis, while the external member is left truly cylindrical. This principle embodied in an internal gear effects continuous bearing with a normal external gear when the teeth of the internal gear are bowed with longitudinally convex side faces symmetrical with their longitudinal median lines. An internally toothed tool, as the tool $T^2$ shown in Fig. 17, having such bowed teeth and gashes or grooves $f$ intersecting its tooth faces to provide cutting edges, is adapted to finish an external gear in a similar fashion to the operation of the tool T of Fig. 6 on an internal gear. It is to be understood that the tool $T^2$ has sufficient convexity of longitudinal tooth face curvature to obtain greatest bearing in the middle zone and gradual diminution toward the ends. The internal teeth of this tool, being concave on their sides in the height, or root to tip dimension, have a relatively close approximation to the tooth curves of an external gear and hence a greater extent of contact in that dimension than an external tool; which facilitates the ultimate attainment of any desired smoothness and perfection of finish in the work. In this case also the teeth of the tool may be either helical in any degree practicable for driving mesh, or straight in the sense of being non-helical, for finishing straight toothed or helical external gears. Internally toothed tools with longitudinally convex sides are shown and claimed in my prior application Serial No. 594,422 and are not claimed here; except as to the feature of excess convexity obtaining variable bearing pressure, which is not disclosed in said application.

This tool and the work gear are mounted on variations of the spindles and holding means shown diagramatically in Fig. 1, in such manner as to effect rotational drive of the work by the tool, or vice versa, and simultaneous lengthwise reciprocation of one relatively to the other lengthwise of the work axis.

The description of operation with respect to the illustrated machine diagram (Fig. 1) is not to be construed as limiting the method to driving the work by the tool exclusively or reciprocating the work. On the contrary, the generic invention comprehends employment of the work gear as the driver; and reciprocation of the tool in parallel with the work gear axis, when either the tool drives the work or the work drives the tool.

It is to be noted further that while the quality of curvature which effects full bearing at the mid part of the tool and gradually diverges toward its ends is an important new feature of the invention and is specifically claimed, nevertheless the protection claimed (in so far as it relates to external tools) is not so limited. The process is operative also in conditions where the tool has substantially uniform bearing throughout its length and with or without axial reciprocation of the work. I consider the form with diminishing bearing preferable because it enables the finishing operation to be carried out with a deeper cutting effect and with less total pressure; hence less, or no, liability to deform the teeth of the work piece.

The tools herein described may be made of any tool steel suitably hard and tough for scrape cutting and burnishing, which are hardened and ground after the teeth have been cut and grooved or gashed. While the grooves which make the cutting edges have been shown in these drawings only in planes perpendicular to the axes of the respective tools, this is because the tools illustrated are those which have non-helical teeth. In the case of helically toothed tools embodying the invention, the grooves may be, and preferably are, helical in complement, that is normal, to the tooth helices, as is shown in certain figures of the drawing of my prior application Serial No. 594,422. Or the grooves may be cut into the sides of the teeth to a limited extent only instead of all the way through them, and at any desired distance apart. The latter formation is preferable where a large number of cutting edges is desired without weakening of the teeth. And tools of corresponding formation may be made of any metal or alloy or other material suitable for burnishing or lapping, without the surface interruptions which make the cutting edges.

The essential characteristics of such tools can be embodied in an infinite variety of specifically different tools, made of different dimensions, different numbers of teeth, different helix angles, and different degrees of tooth face curvature suited to the gears of various dimensions, pitches, etc., for which they are designed to be used.

When a straight-toothed tool is run with a helical work gear, or vice versa, the angle between their axes is equal to the helix angle of the work gear or the tool, whichever one has the helical teeth. If both are helical, the inclination between the axes is equal to difference between, or the sum of, their respective helix angles, depending on whether both are of the same hand or of opposite hands, and whether one is internal or both are external. For concise generic statement of all these conditions, it may be considered that straight teeth embody the limiting condition of helical teeth, i. e., that where the helix angle is zero. From this point of view, the statement that the angle between the axes is equal to the sum or difference of the helix angles of the respective teeth of tool and work gear embraces all conditions. Such sum or difference is, of course, equal to the helix angle of one gear only when the angle of the other is zero.

It has been stated previously that the longitudinal bowing or curving of the tool tooth faces in a manner which effects contact through less than the entire common length of such tool teeth and the work gear teeth enables a desired intensity of unit pressure between the mating teeth of tool and work gear to be obtained without excessive total pressure. This is a phase of the invention which is useful in other conditions than where the axes of tool and work gear are mutually askew. That is, it may be used when the axes are parallel and the teeth of both gears are straight (in the sense of being non-helical) or the teeth of both are helical with equal helix angles of opposite hand. If in such cases the teeth of the tool are bowed with convex longitudinal curvature of their opposite faces relatively to their median lines, their contact with the mating tool gear teeth is greatest in their mid length and diminishes gradually to a clearance on both sides more or less short of both ends, just as previously described. Such tool teeth when interrupted by grooves or gashes forming cutting edges, are highly effective for scraping and burnishing; or if made with continuous faces, are effective for burnishing or lapping. Of course with the parallel axis arrangement relative axial reciprocation is necessary to effect the cutting action and to distribute such action, and the burnishing or lapping effects as well, throughout the length of the work gear, since there is no longitudinal slip due to divergence between the paths in which the mating teeth travel. Hence the reciprocation may well be relatively much more rapid in proportion to the peripheral speed than that previously indicated with respect to skewed tool and work gear. However, the bowed formation of the tool gear teeth enables a relatively great intensity of unit pressure to be obtained at the contact area without necessitating a great total pressure.

What I claim and desire to secure by Letters Patent is:

1. A gear finishing tool having teeth adapted to run in mesh with a work gear and being of such oppositely bowed longitudinal curvature in their opposite sides as to effect a limited length of contact with the gear to be finished.

2. A gear finishing tool of gear form having teeth conjugate to the teeth of a given work gear when meshing with such work gear in skewed relationship, the opposite side faces of the tool teeth being longitudinally bowed with substantially symmetrical curvature relative to their longitudinal median lines such as to cause full bearing in a portion only of their length with the work gear teeth and a gradually diminishing bearing from the region of such full bearing toward the end.

3. A gear finishing tool having teeth adapted to run in mesh with a work gear when placed with its axis at an inclination to, and in a different plane from, the axis of such work gear, which teeth are of such longitudinally and oppositely bowed curvature in their opposite sides as to bear fully in their mid length portion on the teeth of the work gear and with extended but gradually diminishing bearing on either side of such mid portion.

4. A gear finishing tool having teeth adapted to run in mesh with a work gear when placed with its axis at an inclination to, and in a different plane from, the axis of such work gear, which teeth are longitudinally convex at opposite sides with a curvature substantially symmetrical relative to their longitudinal median lines and a convexity sufficient to cause full bearing in a portion of their length only with the teeth of the work gear and an extended but gradually diminishing bearing away from the region of full bearing.

5. A gear finishing tool having external teeth conjugate to the teeth of a given external work gear and disposed to mesh with the teeth of such work gear when the tool is placed with its axis at an inclination to and in a different plane from the axis of the work gear, the opposite side faces of the tool teeth being longitudinally curved with a concave curvature sufficient to make extended contact lengthwise with the tooth faces of the gear to be finished.

6. A gear finishing tool having external teeth conjugate to the teeth of a given external work gear and disposed to mesh with the teeth of such work gear when the tool is placed with its axis at an inclination to and in a different plane from the axis of the work gear, the opposite side faces of the tool teeth being longitudinally curved with a concave curvature sufficient to cause full bearing in a region between their ends with the teeth of such work gear and extended but gradually diminishing bearing away from such region.

7. A gear finishing tool having external teeth conjugate to the teeth of a given internal work gear and disposed to mesh with the teeth of such work gear when the tool is placed with its axis at an inclination to and in a different plane from the axis of the work gear, the opposite side faces of the tool being longitudinally curved with a convex curvature sufficient to cause extended lengthwise bearing between the teeth of the tool and the flanking teeth of the work gear.

8. A gear finishing tool having external teeth conjugate to the teeth of a given internal work gear and disposed to mesh with the teeth of such work gear when the tool is placed with its axis at an inclination to and in a different plane from the axis of the work gear, the opposite side faces of the teeth of the tool being longitudinally convex with a curvature such as to cause full bearing in a region between their ends with the flanking teeth of such internal gear, and an extended but gradually diminishing bearing away from such region.

9. A tool for shaping gear teeth having teeth disposed and spaced apart from one another around an axis, said teeth being provided with cutting edges in their sides located in longitudinal curves which are concave with respect to the longitudinal median lines of the teeth.

10. A gear finishing tool as set forth in claim 2, in which the side faces of the teeth are interrupted by spaces, the boundaries of such spaces being cutting edges.

11. A gear finishing tool as set forth in claim 3, in which the side faces of the teeth are provided with longitudinally separated cutting edges.

12. A gear finishing tool as set forth in claim 5, in which the side faces of the teeth are provided with longitudinally separated cutting edges.

13. A gear finishing tool as set forth in claim 6, in which the side faces of the teeth are intersected by gaps forming cutting edges.

14. A gear finishing tool as set forth in claim 7, in which the side faces of the teeth are intersected by gaps forming separated cutting edges.

EDWARD W. MILLER.